United States Patent [19]

Heyman et al.

[11] Patent Number: 4,843,346

[45] Date of Patent: Jun. 27, 1989

[54] RADIO FREQUENCY STRAIN MONITOR

[75] Inventors: Joseph S. Heyman, Williamsburg; Robert S. Rogowski, Hampton; Milford S. Holben, Jr., Williamsburg, all of Va.

[73] Assignee: Administrator, National Aeronautics and Space Administration, Washington, D.C.

[21] Appl. No.: 203,177

[22] Filed: Jun. 7, 1988

[51] Int. Cl.[4] .......................................... G01N 27/00
[52] U.S. Cl. ...................................... 331/65; 73/763
[58] Field of Search .................... 331/65; 73/760, 763, 73/768; 340/665; 364/508, 550

[56] References Cited

U.S. PATENT DOCUMENTS

| | | |
|---|---|---|
| 2,862,200 | 11/1958 | Shepherd et al. |
| 3,812,709 | 5/1974 | Benson et al. |
| 4,014,208 | 3/1977 | Moore et al. |
| 4,096,740 | 6/1978 | Sallee |
| 4,269,506 | 5/1981 | Johnson et al. |
| 4,363,242 | 12/1982 | Heyman |
| 4,609,885 | 9/1986 | Renoult ................. 331/65 X |
| 4,624,142 | 11/1986 | Heyman |
| 4,654,520 | 3/1987 | Griffiths |

Primary Examiner—Eugene R. Laroche
Assistant Examiner—Robert J. Pascal
Attorney, Agent, or Firm—Harold W. Adams; John R. Manning; Charles E. B. Glenn

[57] ABSTRACT

A radio frequency strain monitor includes a voltage controlled oscillator for generating an oscillating signal that is input into a propagation path. The propagation path is preferably bonded to the surface of a structure to be monitored and produces a propagated signal. A phase difference between the oscillating and propagated signals is detected and maintained at a substantially constant value which is preferably a multiple of 90° by changing the frequency of the oscillating signal. Any change in frequency of the oscillating signal provides an indication of strain in the structure to which the propagation path is bonded.

18 Claims, 2 Drawing Sheets

RADIO FREQUENCY STRAIN MONITOR

ORIGIN OF THE INVENTION

The invention described herein was made in performance of work under a NASA contract and is subject to the provisions of Section 305 of the National Aeronautics and Space Act of 1958, as amended, Public Law 85-568 (72 Stat. 435, 42 USC 2457).

BACKGROUND OF THE INVENTION

1. Field of the Invention

The present invention is related to an apparatus for measuring strain in a structure and, more particularly, to an apparatus capable of measuring strain in parts per million to 10% or more along the entire extent of the structure in any direction.

2. Description of the Related Art

There are a number of types of conventional strain gauges. A first class of strain gauges measures changes in length at a local site, typically less than one centimeter. This class of strain gauges includes resistance devices and linear variable differential transformers (LVDTs). A second class of strain gauges uses electromagnetic radiation, most commonly laser generated light, travelling along an optical fiber, or interferometry. Examples of strain measurement using lasers and optical fibers are disclosed in U.S. Pat. Nos. 4,269,506 and 4,654,520. These systems use pulsed lasers and measure changes in the time required for light to travel over the optical fiber. Thus, these systems require means for very precise time measurement and are useful primarily for extremely long objects.

There are some conventional strain measuring apparatuses which use electromagnetic radiation in the radio or microwave frequencies. U.S. Pat. No. 2,862,200 discloses a system which creates a standing wave in a waveguide bonded to a structure to be monitored with probes separated by one quarter of the wavelength of the electromagnetic radiation. The length of the waveguide is changed as the length of the structure changes and changes in the phase difference between 90° and 180° as detected by the two sensors is used to calculate the strain in the structure.

Radio frequency acoustic waves are used in a system disclosed by U.S. Pat. No. 4,363,242 in which a transducer is attached to an object, such as a bolt, to inject radio frequency acoustic waves into the object and to detect reflected waves. This system is limited by the transmission properties of the object to frequencies which are not greatly attenuated.

SUMMARY OF THE INVENTION

An object of the present invention is to provide a relatively inexpensive strain measuring apparatus capable of measuring strain over the entire length or other dimension of a structure.

Another object of the present invention is to provide a strain measuring apparatus which can be used to measure strain in parts per million to over 10%.

A further object of the present invention is to provide a strain measurement apparatus which can measure a structure constructed of any material using radio frequency waves.

The above objects are attained by providing an apparatus for measuring strain in a structure, comprising: signal generation means for generating an oscillating signal; propagation path means, associated with the structure and operatively connected to the signal generation means, for defining a path, excluding a substantial portion of the structure, for propagation of the oscillating signal to produce a propagated signal; detection means, receiving the oscillating signal from the signal generation means and the propagated signal from the propagation path means, for detecting a phase difference between the oscillating signal and the propagated signal; and control means for controlling the frequency of the oscillating signal generated by the signal generation means in dependence upon the phase difference and for indicating strain in the structure in dependence upon change in the frequency of the oscillating signal.

Preferably, the signal generation means includes a voltage controlled oscillator producing an oscillating electromagnetic signal at a frequency which is varied by the control means to maintain the phase difference between the oscillating electromagnetic signal and the propagated signal at a multiple of 90°. In a first embodiment, the oscillating signal enters at one end of the propagation path means and a propagated signal is extracted from the other end. In a second embodiment of the present invention, the second end of the propagation path means comprises signal termination means for terminating or reflecting the oscillating signal and at least one impedance discontinuity is included in the propagation path means whereby a reflected signal is produced by the impedance discontinuity and the reflected signal is extracted from the first end of the propagation path means as the propagated signal. In the second embodiment of the invention, there may be a plurality of propagation paths bonded to the structure for detecting strain in different directions, each of which is monitored by detecting changes in frequency to maintain a constant phase difference between the oscillating signal and the propagated signal.

These objects, together with other objects and advantages which will be subsequently apparent, reside in the details of construction and operation as more fully hereinafter described and claimed, reference being made to the accompanying drawings forming a part hereof, wherein like reference numerals refer to like parts throughout.

DESCRIPTION OF THE PREFERRED EMBODIMENTS

Figure 1:
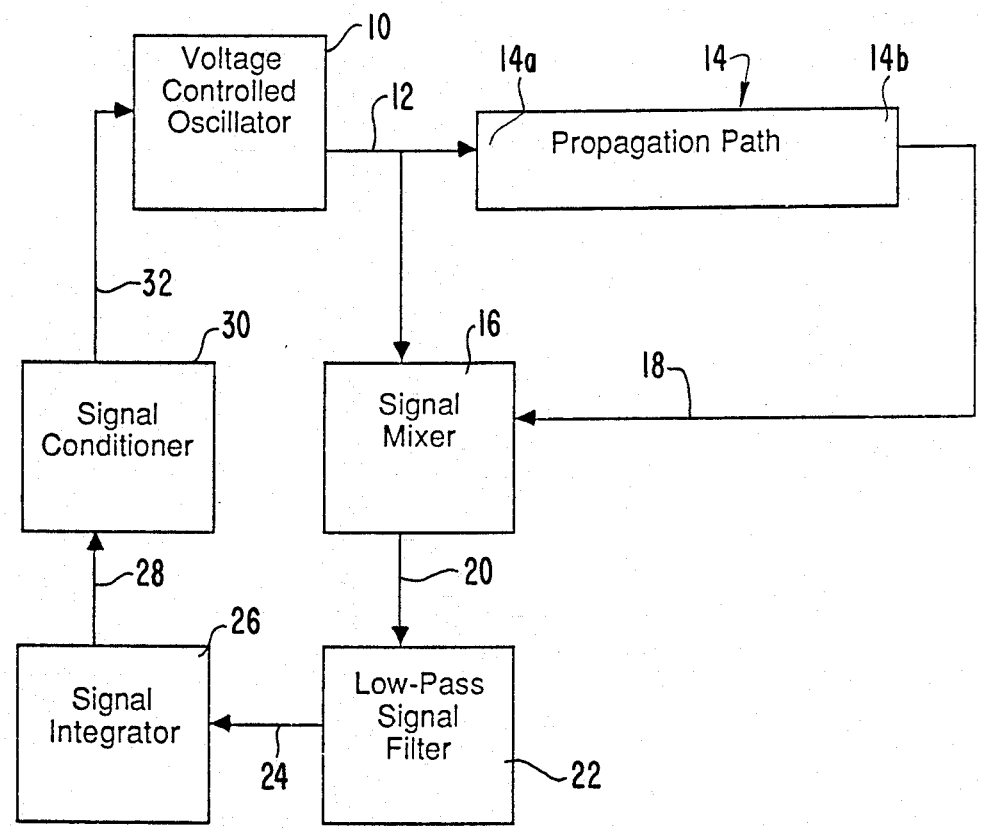
FIG. 1 is a block diagram of a first embodiment of the present invention.

As illustrated in FIG. 1, a strain measuring apparatus according to the present invention comprises signal generation means for generating an oscillating signal. The signal generation means may be a voltage controlled oscillator 10 which generates an oscillating electromagnetic signal 12. The oscillating signal 12 is supplied to a first end 14a of a propagation path 14 and to a first input of a signal mixer 16. The propagation path 14 forms propagation path means, associated with a structure for defining a path, excluding a substantial portion of the structure, for propagation of the oscillating signal. The propagation path 14 may be embedded in or bonded to a surface of the structure which will be monitored for strain. In the first embodiment, the propagation path 14 defines a path for propagating the oscillating electromagnetic signal 12 from the first end 14a to a second end 14b from which a propagated signal 18 is output to a second input of the signal mixer 16. The signal mixer combines the oscillating signal 12 and the propagated signal 18 to produce a phase delay signal 20 at an output. The phase delay signal 20 includes a DC component which is filtered by a low-pass signal filter 22 to produce a phase difference signal 24. Thus the signal mixer 16 and low-pass filter 22 form detection means for detecting a phase difference between the oscillating signal 12 and the propagated signal 18.

Prior to loading the structure to which the propagation path 14 is bonded or in which it is embedded, the frequency of the oscillating signal 12 is adjusted so that the phase difference signal 24 indicates a quadrature phase difference which is a multiple of 90°. The phase difference signal 24 is supplied to an input of a signal integrator 26 which produces an integrated signal 28 at an output by integrating the phase difference signal 24. A signal conditioner 30 conditions the integrated signal 28 to produce a control signal 32 having a voltage controlling the voltage controlled oscillator 10 in dependence upon the integrated signal 28 to maintain the phase difference at the initially set multiple of 90°. As a result, when the length of the propagation path 14 changes due to strain in the structure, the phase difference detected by the signal mixer 16 and low-pass filter 22 temporarily changes causing the control signal 32 to change the frequency of the oscillating signal 12. Thus, the change in the frequency of the oscillating electromagnetic signal 12 provides an indication of strain in the structure. The relationship of changes in frequency of a signal which is adjusted to maintain a constant quadrature phase difference between the signal and a reflection or propagation of the signal is disclosed in U.S. Pat. No. 4,363,242 to Heyman, incorporated herein by reference.

Unlike the apparatus disclosed in Heyman which uses acoustic waves oscillating at radio frequency, the present invention preferably uses an electromagnetic signal oscillating in the megahertz to gigahertz range, and the propagation path 14 is preferably a radio frequency cable, such as a coaxial cable, or a conductive film formed on a non-conductive surface of the structure. By selecting a high frequency, the apparatus can make precise measurements of small amounts of strain, even in parts per million. Use of a relatively low frequency oscillating signal 12 permits precise measurement of large amounts of strain, even 10% or more. In addition, the length of the propagation path may be as small as a few millimeters or as long as several kilometers with the only limitation being the attenuation in the propagation path in measuring strain in a long structure.

Figure 2:
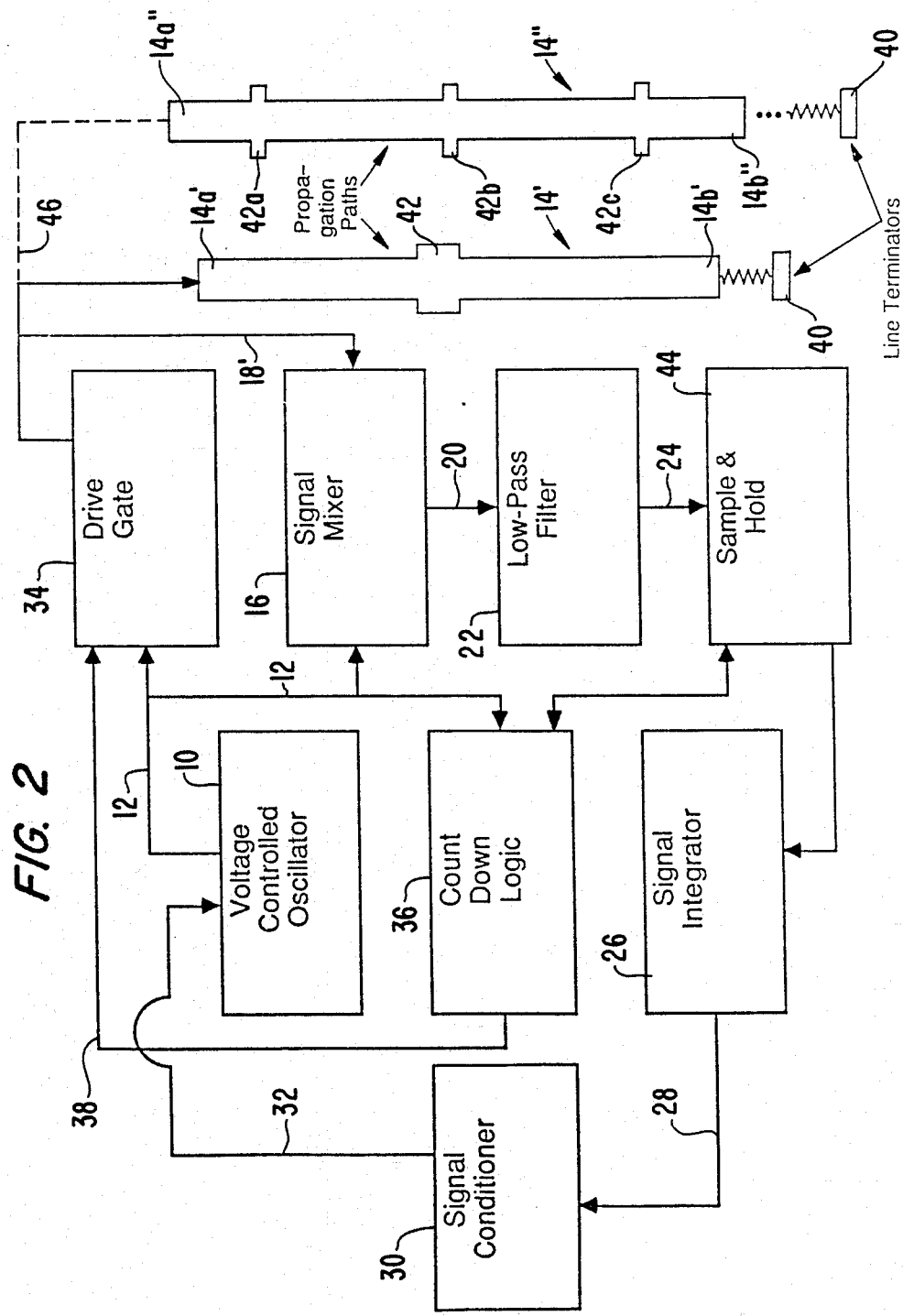
FIG. 2 is a block diagram of a second embodiment of the present invention.

In the second embodiment illustrated in FIG. 2, all of the elements of the first embodiment are included and operate in a similar manner in the second embodiment. In addition, a drive gate 34 is operatively connected to the voltage controlled oscillator 10 and the first end 14a' of the propagation path 14'. The drive gate 34 is controlled by a gate control circuit formed by countdown logic 36. The drive gate 34 is initially closed while the countdown logic 36 verifies the frequency of the oscillating signal 12. A drive gate control signal 38 opens the drive gate 34 for a short period of time to supply a pulse of the oscillating signal 12 to the first end 14a' of the propagation path 14'.

Instead of supplying the propagated signal 18 to the signal mixer from the second end 14b' of the propagation path 14', an impedance or line terminator 40 is coupled to the second end 14b' of the propagation path 14' to prevent reflection of the oscillating signal 12. An impedance discontinuity 42 produces a reflected signal by reflecting the oscillating signal 12. The reflected signal is output from the first end 14a' of the propagation path 14' as the propagated signal 18'. The countdown logic 36 closes the drive gate 34 shortly after opening so that the reflected signal 18' is output after the drive gate 34 has closed. As a result, only the reflected signal 18' is supplied to the second input of the signal mixer 16 to be mixed with the oscillating signal 12 which is continuously produced by the voltage controlled oscillator 10.

As in the first embodiment, the phase delay signal 20 output from the signal mixer 16 is filtered in the low-pass filter 22 to produce the phase difference signal 24. Since the signal 24 will only represent the phase difference during the time the reflected signal 18' is applied to the signal mixer 16, a sample and hold circuit 44 is controlled by the countdown logic 36 to store the phase difference produced for each pulse of the oscillating signal 12 output from the drive gate 34. Thus the signal integrator 26 is able to continuously generate an integrated signal 28 which is conditioned by the signal conditioner 30 to produce the signal controlling the frequency of the oscillating electromagnetic signal 12 to maintain the phase difference stored in the sample and hold circuit 44 at a multiple of 90°.

In the second embodiment, the propagation half may include a plurality of impedance discontinuities 42a, 42b, 42c, as illustrated in propagation path 14". In this case, more than one reflected signal will be output from the second end 14a" of the propagation path 14". Therefore, the sample and hold circuit 44 is controlled by the gate control circuit or countdown logic 36 to sample the phase differences between the oscillating signal 12 and the reflected signals 18' from each of the impedance discontinuities 42a, 42b, 42c. As a result, the gate control circuit 36 is able to distinguish phase differences corresponding to each of the impedance discontinuities 42a, 42b, 42c, and is thereby able to provide an indication of strain between each of the impedance discontinuities 42a, 42b and 42c and between at least one of the impedance discontinuities, such as 42a, and the first end 14a" of the propagation path 14". In addition, the drive gate 34 may be controlled by the gate control circuit 36 to output the oscillating signal 12 with a frequency which will maintain a particular one of the phase differences corresponding to one of the impedance discontinuities 42a, 42b, 42c at a substantially constant value.

As indicated by dashed line 46, the second embodiment is able to monitor strain in more than one propagation path. When, e.g., two propagation paths 14' and 14" are coupled to the drive gate 34, the gate control circuit controls the drive gate 34 to supply pulses to each of the propagation paths 14' and 14" and contros the sample and hold circuit 44 to store phase differences between the first and 14a' or 14a" and the at least one impedance discontinuity 42 or 42a, 42b, 42c in each of the propagation paths 14' and 14". Thus, the gate control circuit is able to output indications of strain in dependence upon change in the frequency of the oscillating electromagnetic signal caused by temporary change in the phase difference between the oscillating electromagnetic signal and the reflecting signals from each of the propagation paths.

The many features and advantages of the present invention are apparent from the detailed specification, and thus, it is intended by the appended claims to cover all such features and advantages of the device which fall within the true spirit and scope of the invention. Further, since numerous specifications and changes will readily occur to those skilled in the art, it is not desired to limit the invention to the exact construction and operation illustrated and described. For example, the number of impedance discontinuities is not limited to one or three and there may be more than two propagation paths monitored by a single gate control circuit. Accordingly, all suitable modifications and equivalence may be resorted to falling within the scope and spirit of the invention.

What is claimed is:

1. An apparatus for measuring strain in a structure, comprising:
   signal generation means for generating an oscillating signal;
   propagation path means, associated with the structure and operatively connected to said signal generation means, for defining a path, excluding a substantial portion of the structure, for propagation of the oscillating signal to produce a propagated signal;
   detection means, receiving the oscillating signal from said signal generation means and the propagated signal from said propagation path means, for detecting a phase difference between the oscillating signal and the propagated signal; and
   control means for controlling the frequency of the oscillating signal generated by said signal generation means in dependence upon the phase difference and for indicating strain in the structure in dependence upon change in the frequency of the oscillating signal.

2. An apparatus as recited in claim 1,
   wherein said signal generation means generates a radio frequency signal, and
   wherein said propagation path means is a radio frequency cable bonded to the structure and operatively connected to said signal generation means and said detection means.

3. An apparatus as recited in claim 1, wherein said propagation path means is a coaxial cable.

4. An apparatus as recited in claim 1, wherein the surface of the structure includes a non-conductive portion, and
   wherein said propagation path means is a flexible conductive film formed on the non-conductive portion of the surface of the structure and operatively connected to said signal generation means and said detection means.

5. An apparatus as recited in claim 1, wherein said propagation path means has a first end operatively connected to said signal generation means and a second end, operatively connected to said detection means, for outputting the propagated signal.

6. An apparatus as recited in claim 5, wherein said detection means comprises:
   a signal mixer having a first input operatively connected to said signal generation means, a second input operatively connected to the second end of said propagation path means and an output; and
   a low-pass signal filter operatively connected between said control means and the output of said signal mixer.

7. An apparatus as recited in claim 5, wherein said control means comprises:
   signal integrator means for integrating the phase difference detected by said detection means to produce an integrated signal; and
   signal conditioner means for conditioning the integrated signal to produce a control signal for controlling said signal generation means.

8. An apparatus as recited in claim 1, wherein said propagation path means has a first end operatively connected to both said signal generation means and said detection means and a second end.

9. An apparatus as recited in claim 8, further comprising signal termination means for preventing reflection of the oscillating signal from the second end of said propagation path means.

10. An apparatus as recited in claim 9, wherein the oscillating signal is an oscillating electromagnetic signal and said signal termination means comprises an impedance terminator coupled to the second end of said propagation path means.

11. An apparatus as recited in claim 10, wherein said propagation path means includes at least one impedance discontinuity between the first and second ends for generating a reflected signal by reflecting the oscillating electromagnetic signal to the first end for detection by said detection means.

12. An apparatus as recited in claim 10, wherein said detection means comprises:
    phase difference means for detecting the phase difference between a reflected signal generated by reflection of the oscillating electromagnetic signal by said impedance discontinuity and the oscillating electromagnetic signal supplied to the first end of said propagation path means by said signal generation means; and
    sample and hold means for storing the phase difference detected by said phase difference means, and
    wherein said control means adjusts the frequency of the oscillating electromagnetic signal to maintain the phase difference at a multiple of 90° and indicates the strain in the structure between the first end and said impedance discontinuity in dependence upon a frequency change produced by temporary change in the phase difference stored in said sample and hold means.

13. An apparatus as recited in claim 12,
    wherein said propagation path means includes a plurality of impedance discontinuities,
    wherein said phase difference means detects phase differences between the oscillating electromagnetic signal supplied to the first end of said propagation path means by said signal generation means and the reflected signal reflected by each of said impedance discontinuities,
    wherein said sample and hold means stores each of the phase differences detected by said phase difference means, and
    wherein said control means controls said signal generation means to generate pulses of the oscillating electromagnetic signal and indicates strain between each of said impedance discontinuities in dependence upon each frequency change caused by temporary changes in the phase differences stored by said sample and hold means.

14. An apparatus as recited in claim 1, wherein the oscillating electromagnetic signal has a frequency in the megahertz to gigahertz range.

15. An apparatus for measuring strain in a structure, comprising:

a voltage controlled oscillator for generating an oscillating electromagnetic signal;

a propagation path, bonded to a surface of the structure and having a first end operatively connected to said voltage controlled oscillator, providing a path means for propagation of the oscillating electromagnetic signal from the first end to a second end and outputting a propagated signal from the second end;

a signal mixer having a first input operatively connected to said voltage controlled oscillator to receive the oscillating electromagnetic signal and a second input operatively connected to the second end of said propagation path to receive the propagated signal and having an output for outputting a phase delay signal by combining the oscillating electromagnetic signal and the propagated signal;

a low-pass filter having an input operatively connected to the output of said signal mixer and an output for outputting a phase difference signal produced by filtering the phase delay signal;

a signal integrator having an input operatively connected to the output of said low-pass filter and an output for outputting an integrated signal produced by integrating the phase difference signal; and signal conditioner means operatively connected to said signal integrator, for outputting a control signal having a voltage controlling said voltage controlled oscillator in dependence upon the integrated signal, whereby an indication of strain in said structure is provided by change in the frequency of the oscillating electromagnetic signal.

16. An apparatus for measuring strain in a structure, comprising:

a voltage controlled oscillator for generating an oscillating electromagnetic signal;

a drive gate operatively connected to said voltage controlled oscillator, for outputting the oscillating electromagnetic signal and dependence upon a gate control signal;

at least one propagation path, each having a first end operatively connected to said drive gate to receive the oscillating electromagnetic signal, a second end providing impedance termination and at least one impedance discontinuity between the first and second ends producing at least one reflected signal;

a signal mixer having a first input operatively connected to said voltage control oscillator, a second input operatively connected to the first end of said propagation path to receive at least one reflected signal and an output for outputting a phase delay signal;

a low-pass filter having an input operatively connected to the output of said signal mixer and having an output for outputting a phase difference signal;

a sample and hold circuit having a first input operatively connected to the output of said low-pass filter, a second input and an output, for storing at least one phase difference between the oscillating electromagnetic signal and the reflected signal;

a signal integrator having an input operatively connected to the output of said sample and hold circuit and an output outputting an integrated signal by integrating the phase difference output by said sample and hold circuit;

a signal control circuit, operatively connected to the output of said signal integrator and to said voltage controlled oscillator for outputting a signal controlling the frequency of the oscillating electromagnetic signal to maintain the phase difference at a substantially constant value; and a gate control circuit, operatively connected to said voltage controlled oscillator, said drive gate and said sample and hold circuit, for controlling the drive gate to output pulses of the oscillating electromagnetic signal, for controlling the storing of the phase difference by said sample and hold circuit and for indicating strain between the first end and the impedance discontinuity in dependence upon change in the frequency of the oscillating electromagnetic signal.

17. An apparatus as recited in claim 16, wherein said at least one propagation path has a plurality of impedance discontinuities, and wherein said gate control circuit outputs an indication of strain between each of the impedance discontinuities and between at least one of the impedance discontinuities and the first end of said propagation path.

18. An apparatus as recited in claim 16, wherein said at least one propagation path includes a plurality of propagation paths, and wherein said gate control circuit controls said drive gate to supply pulses to each of said propagation paths and controls said sample and hold circuit to store phase differences between the first end and the impedance discontinuity in each of said propagation paths and said gate control circuit outputs indications of strain in dependence upon change in the frequency of the oscillating electromagnetic signal caused by temporary change in the phase difference between the oscillating electromagnetic signal and the reflected signals from each of said propagation path.

* * * * *